No. 662,005. Patented Nov. 20, 1900.
J. C. LEWIS.
COMBINATION TOOL.
(Application filed Sept. 12, 1898. Renewed Mar. 27, 1900.)

(No Model.) 3 Sheets—Sheet 1.

Witnesses.

Inventor
James C. Lewis
by R. S. & A. B. Lacey
his Attorneys

THE NORRIS PETERS CO., PHOTO-LITHO., WASHINGTON, D. C.

No. 662,005. Patented Nov. 20, 1900.
J. C. LEWIS.
COMBINATION TOOL.
(Application filed Sept. 12, 1898. Renewed Mar. 27, 1900.)
(No Model.) 3 Sheets—Sheet 2.
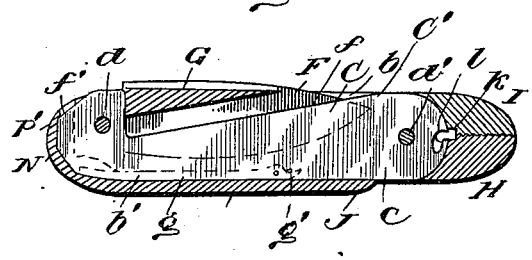
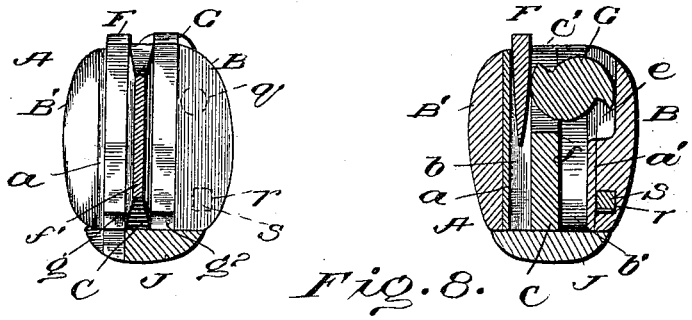
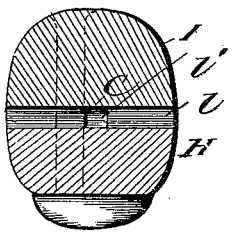
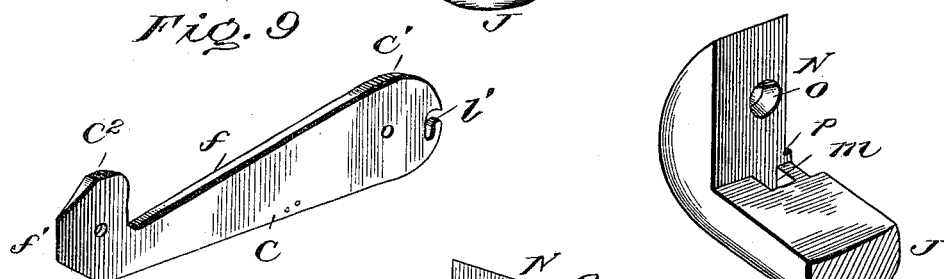
Witnesses
Inventor
James C. Lewis
by R. S. & A. B. Lacey
his Attorneys No. 662,005. Patented Nov. 20, 1900.
J. C. LEWIS.
COMBINATION TOOL.
(Application filed Sept. 12, 1898. Renewed Mar. 27, 1900.)
(No Model.) 3 Sheets—Sheet 3.
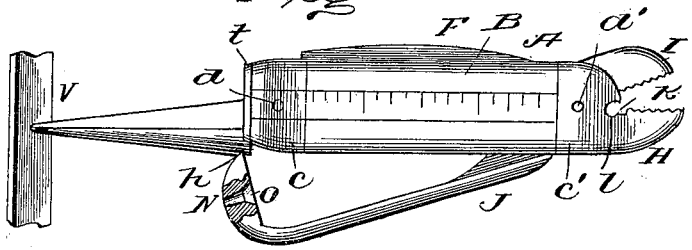
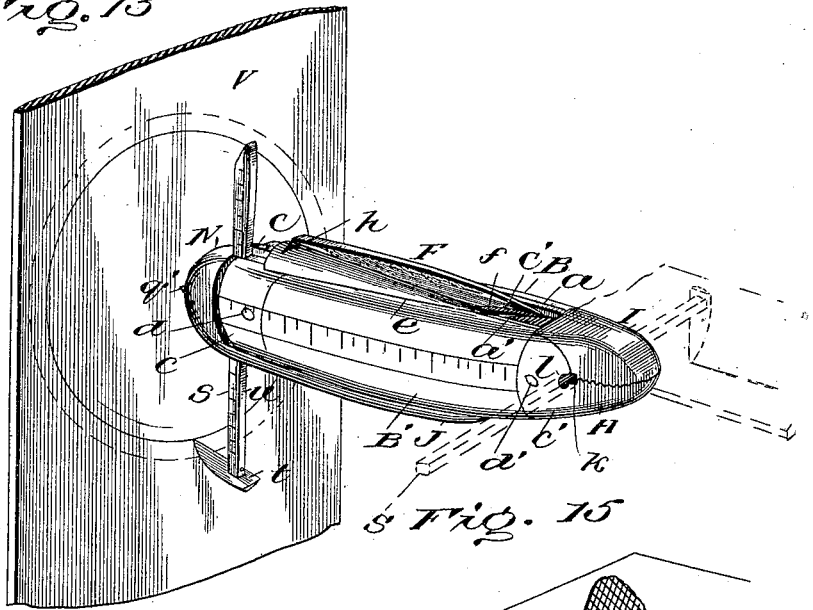
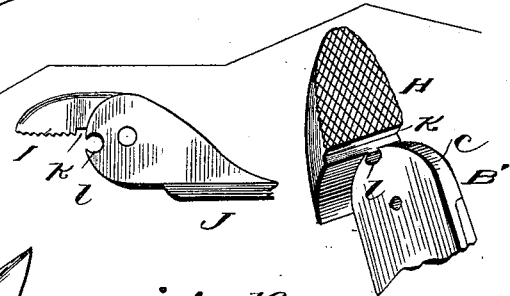
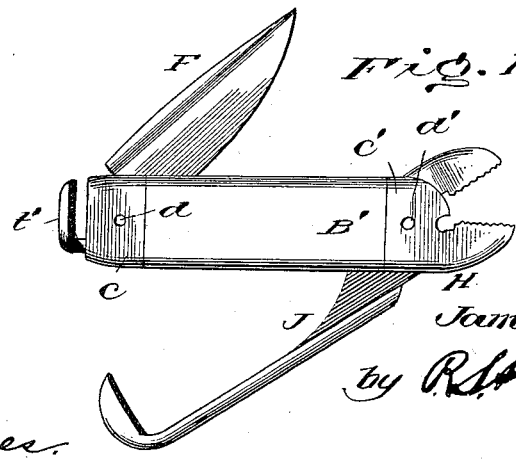
Inventor
James C. Lewis
by R. S. & A. B. Lacey
his Attorneys
Witnesses
THE NORRIS PETERS CO., PHOTO-LITHO., WASHINGTON, D. C.

UNITED STATES PATENT OFFICE.

JAMES C. LEWIS, OF TRACY, CALIFORNIA.

COMBINATION-TOOL.

SPECIFICATION forming part of Letters Patent No. 662,005, dated November 20, 1900.

Application filed September 12, 1898. Renewed March 27, 1900. Serial No. 10,408. (No model.)

*To all whom it may concern:*

Be it known that I, JAMES CATLIN LEWIS, a citizen of the United States, residing at Tracy, in the county of San Joaquin and State of California, have invented certain new and useful Improvements in Combination-Tools; and I do hereby declare the following to be a full, clear, and exact description of the invention, such as will enable others skilled in the art to which it appertains to make and use the same.

This invention relates generally to improvements in combination-tools, and particularly to improvements in pocket-knives, the object being to provide a knife of novel construction, in which the handle is adapted to embrace a number of auxiliary tools or implements designed to perform a variety of useful functions.

With this and other objects in view the invention consists in the novel features of construction, combination, and arrangement of parts hereinafter more fully described, and particularly pointed out in the appended claims.

Figure 1:
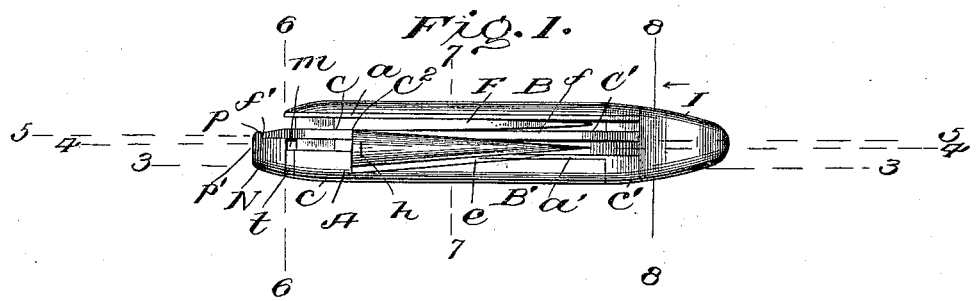
Figure 2:
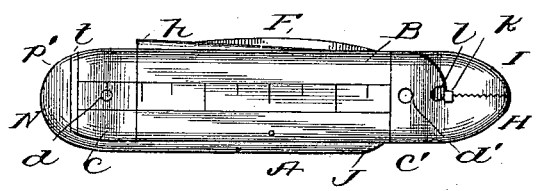
Figure 3:
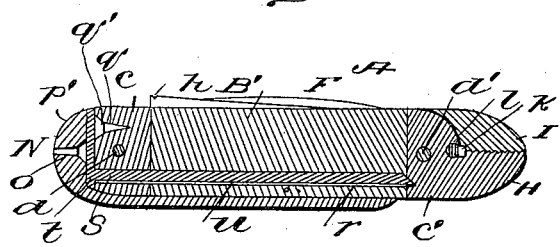
Figure 4:
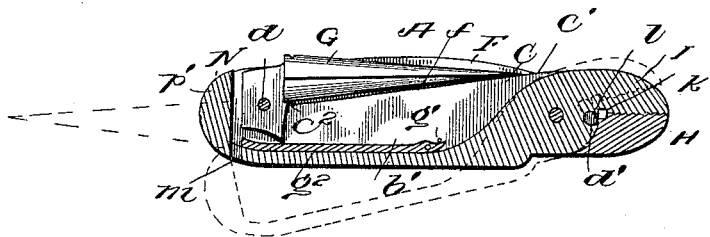

In the accompanying drawings, Figure 1 is a top plan view of a pocket-knife constructed in accordance with my invention. Fig. 2 is a side elevational view thereof. Figs. 3, 4, and 5 are longitudinal sectional views taken, respectively, on lines 3 3, 4 4, and 5 5 of Fig. 1. Figs. 6, 7, and 8 are cross-sectional views taken, respectively, on lines 6 6, 7 7, and 8 8 of Fig. 1. Fig. 9 is a perspective view of the central partition or division plate. Figs. 10 and 11 are perspective views of the free end of the pivoted arm looking toward opposite sides of the lug carried thereby. Fig. 12 is a side view of the knife, showing the manner of using the screw-bit or leather-punch. Fig. 13 is a perspective view of the knife, showing in full and broken lines the manner of employing the graduated stem and cutter-blade for cutting washers, lace-strings, straps, &c. Fig. 14 is a detail view of the graduated stem and attachments. Fig. 15 shows a side view of the movable jaw and a perspective view of the fixed jaw of the pliers. Fig. 16 is a side view of the knife, illustrating a modification in the construction of its parts.

Like letters of reference designate corresponding parts throughout the several views of the drawings.

The handle A of the knife comprises in its construction two side pieces B and B', made of buckhorn or some other suitable material, metallic wear and stiffening plates $a$ and $a'$, arranged on the inner faces of said side pieces, and a central partition or division plate C, forming in conjunction therewith two pockets or chambers $b$ and $b'$ for the reception of the pivoted knife-blade and auxiliary tools hereinafter described. The parts are protected and reinforced, as usual, by metallic end pieces $c$ and $c'$ and united by transverse pintle-rivets $d$ and $d'$. In order to enlarge the upper portion of the chamber $b'$, the side piece B is formed with a tapered recess $e$ and the upper edge $f$ of the division-plate is inclined downwardly parallel with the bottom wall of said recess from one end C' to the other end $C^2$ thereof, as clearly shown in Figs. 5 and 9. The said end $C^2$ of the division-plate projects beyond the end pieces $c$ and terminates in a screw-driver point $f$.

Pivoted to the pintle $d$ is a knife-blade F, that is adapted when closed to occupy the chamber $b$. The tang of this blade bears upon the long arm of a pivoted back spring $g$, the short arm of which is adapted to contact with a stop-pin $g'$ to limit the downward movement of said long arm. To the said pintle is also pivoted a tapered screw-bit or leather-punch G, that is adapted when closed to snugly fit into the enlarged upper portion of the chamber $b'$. This punch may be employed for punching and boring holes in leather, wood, or other materials and for all purposes for which a pointed and screw bladed tool is adapted. By turning the punch to the left or in the reverse direction to that in which it is turned for cutting it may be used to fill the function of a lacing-awl in swaging or swelling holes in leather and analogous materials. The tang of the punch bears against a back spring $g^2$, similar in construction to the spring $g$, and serving, like said latter spring, to hold the pivoted member firmly in any desired position to which it is adjusted for use. The manner of employing the punch is clearly shown in Fig. 12.

Formed integrally with one or both of the end pieces c or connected thereto in any suitable manner, as desired, is a rigid jaw H, forming part of a pair of pliers. The movable jaw I, coacting therewith, is provided with an extension j, pivoted to the pintle d' and arranged to move freely in the adjoining end of the chamber b'. This extension is connected to an arm J, adapted to close upwardly against the under side of the knife-handle and forming a handle by which the movable jaw may be conveniently operated. The meeting faces of the jaws are preferably serrated to insure a firm grip on the object engaged thereby and are formed in rear of their serrated portions with transverse grooves or notches k to receive small nuts, and thus adapt the device for use as a wrench and for holding the washer and lace-cutter hereinafter described. In rear of the notches the jaws are also formed with diagonally-arranged nearly circular openings l, forming when the pivoted jaw is open an angular way. Wire and rivets may be conveniently cut by inserting the same in said way and then forcing the pivoted jaw closed, the latter moving past the serrated face of the rigid jaw, and thereby opering to effect a shear cut. The end C' of the division-plate is also formed with a notch l', arranged in line with the opening in the lower jaw to permit of the insertion of the material to be cut.

The pivoted arm J is provided at its free end with a vertical slot m and carries an upwardly-projecting lug N, having a countersunk hole O, extending horizontally therethrough and projecting at right angles to the said opening m in the arm. The lug is somewhat narrower than the arm and is cut away on its inner face to form a recess p to receive the screw-driver point f' when the arm is closed, as shown in Figs. 1 to 5, inclusive, the outer wall p' of said recess serving to effectually shield the point and prevent injury thereto, and also to prevent said point from catching in the clothes of the user when the knife is inserted into and withdrawn from the pocket. As the lug terminates in line with the division-plate it will be noted that the knife-blade, the member used most frequently, may be conveniently opened and closed without the necessity of moving the pivoted arm or interfering with the other operative parts of the knife. The point or upper edge of the lug is adapted to engage a notch h in the screw-punch to hold the latter in position while in use.

The metallic end piece c of the handle is provided in its end adjacent to the screw-driver point with a countersunk socket q to receive a headed pivot-pin q', and the side piece B and end piece are channeled in their inner faces below said socket to form, in conjunction with the adjoining metal plate a', a longitudinal chamber r. This chamber is designed to receive the device shown in detail in Fig. 14, which is adapted to serve the several functions of a pair of tweezers, a cutter for making washers, lacing-strings, straps, &c., and a caliper-rule for measuring the diameter of bolts, bolt-heads, pipes, and analogous circular objects. This device consists of a graduated stem or shank S, beveled on its outer side at one end and carrying at its other end a right-angular projection, constituting in this instance a blade t, having a cutting-point. To the rear side of the stem is secured at one end a plate-spring u, the free end of which is curved and abuts against the point of the beveled end of the stem to form therewith tweezers of simple and effective construction. This spring also serves to impinge against the wall of the chamber r and hold the stem in position therein. When the parts of the knife are closed or when the knife-blade is alone in use, the lug N shields the blade t, and the latter holds the pivot-pin q' against displacement. The object in employing a headed pivot-pin is to permit of the use of an ordinary tack should the original pin be lost or misplaced.

The operation of the pliers, screw-punch, and pivoted arm will be clearly understood from the foregoing description, and the mode of use of the device (shown in detail in Fig. 13) will now be briefly set forth. When it is desired to use this device for cutting out washers from leather or other material, the arm J is swung down to the position shown in Fig. 12 and the pivot-pin, together with said device, withdrawn. The pin is then inserted in the countersunk hole O in the lug N, with its point projecting outwardly, the stem S passed through the slot m in the pivoted arm and adjusted as desired, and the pivoted arm then closed, so as to clamp the stem between the lug and end of the knife-handle. The spring u holds the stem in the slot while it is being adjusted, and the stem bears against the pivot-pin and prevents retraction thereof. By now forcing the pin into the leather or other material (denoted V) the tool may be conveniently revolved to cut the outer circle and the parts then adjusted to cut the inner circle in the usual manner. When it is desired to cut lacing-strings or to split the material into strips to form straps and the like, the device may be held in the same manner, but with its blade projecting at right angles to the position just described or held in the wrench-notches k between the jaws of the pliers, as shown in Fig. 13. By resting the side of the knife-handle against the edge of the material the blade may be adjusted to cut at any desired distance therefrom and the material conveniently cut in a straight line by drawing the knife in the proper direction parallel with said edge.

In the embodiment of my invention (disclosed in Fig. 16) the construction is modified by dispensing with the screw-punch G, the hole O in the lug, and the pivot-pin q' and its slot q. The projection on the graduated stem S is also in this instance made in the form of a blunt shoulder or arm t', which takes the place of the blade $t$. As thus constructed, the graduated stem and shoulder are intended for use in connection with either the pivoted arm or the tool-handle for measuring the diameter of bolts, bolt-heads, small pipes, and other round bodies similar to a caliper-rule. In employing the device for this purpose the stem may be simply drawn out from its chamber $r$ and the article to be measured placed between the shoulder and the end of the handle, or the stem may be inserted in the slot $m$ and the article placed between the shoulder and lug N. By then adjusting the stem the diameter of the article may be readily ascertained.

From the foregoing description, taken in connection with the accompanying drawings, it will be seen that my invention provides a combination-tool which is simple in construction and embodies advantages due to its peculiar construction alone. It forms a simple and convenient implement which may be readily carried in the pocket without annoyance or inconvenience and which is adapted to serve a variety of useful purposes.

It will of course be understood that changes in the form, proportion, and minor details of construction may be made within the scope of the invention without departing from the spirit or sacrificing any of the advantages thereof.

Having thus described the invention, what is claimed as new is—

1. In combination, a handle, an arm pivoted to the handle and having an opening transversely of its free end, and a tool insertible in the opening of the pivoted arm and adapted to be clamped between the end of the handle and a part of the arm, substantially as described.

2. In combination, a handle, an arm pivoted to the handle and having an offstanding lug and a transverse opening adjacent to the lug, and a tool insertible in the said opening and adapted to be clamped between the end of the handle and the lug of the pivoted arm, substantially as specified.

3. In combination, a handle, an arm pivoted to the handle and having an offstanding lug provided with a pivot-opening, and having a transverse opening adjacent to the said lug, a pivot-pin fitted in the said pivot-opening, and a tool insertible in the transverse opening of the pivoted arm and adapted to be clamped between the lug thereof and the handle and extending across the pivot-opening and holding the pivot-pin in place, substantially as set forth.

4. In combination, a handle having a longitudinal chamber and a pivot-socket, a tool slidable in the chamber and having a blade to extend over the pivot-socket, an arm pivoted to the handle and having a lug at its farther end and a transverse opening adjacent to the lug, the latter being formed with a pivot-pin opening, and a pivot-pin adapted to be held in either the pivot-socket or pivot-pin opening by means of the said slidable tool and lug of the pivoted arm, substantially as specified.

In testimony whereof I affix my signature in presence of two witnesses.

JAMES C. LEWIS.

Witnesses:
HOWARD E. HULL,
GEORGE L. FRERICHS.